United States Patent
Purnhagen et al.

(10) Patent No.: US 11,037,582 B2
(45) Date of Patent: *Jun. 15, 2021

(54) AUDIO DECODER UTILIZING SAMPLE RATE CONVERSION FOR FRAME SYNCHRONIZATION

(71) Applicant: DOLBY INTERNATIONAL AB, Amsterdam Zuidoost (NL)

(72) Inventors: Heiko Purnhagen, Sundbyberg (SE); Kristofer Kjoerling, Solna (SE); Alexander Stahlmann, Nuremberg (DE); Jens Popp, Nuremberg (DE); Karl Jonas Roeden, Solna (SE)

(73) Assignee: Dolby International AB, Amsterdam Zuidoost (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/903,591

(22) Filed: Feb. 23, 2018

(65) Prior Publication Data

US 2018/0247660 A1    Aug. 30, 2018

Related U.S. Application Data

(62) Division of application No. 14/779,170, filed as application No. PCT/EP2014/056848 on Apr. 4, 2014, now Pat. No. 9,911,434.

(Continued)

(51) Int. Cl.
*G10L 19/22* (2013.01)
*G10L 21/055* (2013.01)
(Continued)

(52) U.S. Cl.
CPC .......... *G10L 21/055* (2013.01); *G10L 19/022* (2013.01); *G10L 19/167* (2013.01);
(Continued)

(58) Field of Classification Search
CPC . G10L 19/008; G10L 19/0208; G10L 19/022; G10L 19/025; G10L 19/18; G10L 19/22; H04N 7/52; H04N 21/4398
(Continued)

(56) References Cited

U.S. PATENT DOCUMENTS 5,394,473 A * 2/1995 Davidson ............ G10L 19/0212
375/240
5,530,750 A * 6/1996 Akagiri ............ G11B 20/00007
704/500
(Continued)

FOREIGN PATENT DOCUMENTS

CN    1287347    3/2001
CN    1295317    5/2001
(Continued)

OTHER PUBLICATIONS

Milic, et al. "Multirate filters: an overview." Proceedings of IEEE Asia Pasific Conference on Circuits and Systems, APCCAS. in Proceedings of IEEE Asia Pasific Conference on Circuits and Systems, APCCAS 2006, Singapore, Dec. 4-7, 2006, pp. 914-917.*
(Continued)

*Primary Examiner* — Daniel Abebe

(57) ABSTRACT

An audio processing system (100) accepts an audio bitstream having one of a plurality of predefined audio frame rates. The system comprises a front-end component (110), which receives a variable number of quantized spectral components, corresponding to one audio frame in any of the predefined audio frame rates, and performs an inverse quantization according to predetermined, frequency-dependent quantization levels. The front-end component may be agnostic of the audio frame rate. The audio processing system further comprises a frequency-domain processing stage (120) and a sample rate converter (130), which provide a reconstructed audio signal sampled at a target sampling
(Continued)

frequency independent of the audio frame rate. By its frame-rate adaptability, the system can be configured to operate frame-synchronously in parallel with a video processing system that accepts plural video frame rates.

8 Claims, 3 Drawing Sheets

Related U.S. Application Data

(60) Provisional application No. 61/808,701, filed on Apr. 5, 2013.

(51) Int. Cl.
| | |
|---|---|
| G10L 19/022 | (2013.01) |
| H04N 21/2368 | (2011.01) |
| H04N 21/439 | (2011.01) |
| G10L 19/16 | (2013.01) |
| H04N 21/43 | (2011.01) |

(52) U.S. Cl.
CPC ..... *H04N 21/2368* (2013.01); *H04N 21/4302* (2013.01); *H04N 21/4398* (2013.01); *G10L 19/22* (2013.01)

(58) Field of Classification Search
USPC .......................................................... 704/500
See application file for complete search history.

(56) References Cited

U.S. PATENT DOCUMENTS

| | | | |
|---|---|---|---|
| 5,899,969 A | 5/1999 | Fielder | |
| 5,936,859 A * | 8/1999 | Huang | G06T 3/4007 375/354 |
| 6,097,558 A | 8/2000 | Oguro | |
| 6,115,689 A | 9/2000 | Malvar | |
| 6,208,276 B1 * | 3/2001 | Snyder | G10L 19/0212 341/123 |
| 6,226,608 B1 | 5/2001 | Fielder | |
| 6,246,345 B1 | 6/2001 | Davidson | |
| 6,629,078 B1 * | 9/2003 | Grill | G10L 19/008 381/2 |
| 6,950,603 B1 | 9/2005 | Isozaki | |
| 8,717,499 B2 | 5/2014 | Bloom | |
| 2002/0128822 A1 | 9/2002 | Kahn | |
| 2003/0108108 A1 * | 6/2003 | Katayama | G10H 1/02 375/245 |
| 2005/0191040 A1 | 9/2005 | Takagi | |
| 2006/0140591 A1 | 6/2006 | Estevez | |
| 2006/0146185 A1 | 7/2006 | Chen | |
| 2007/0244695 A1 * | 10/2007 | Manjunath | G10L 19/24 704/201 |
| 2008/0114605 A1 * | 5/2008 | Wu | G11B 20/00007 704/500 |
| 2008/0123972 A1 | 5/2008 | Sekiguchi | |
| 2008/0152309 A1 | 6/2008 | Shih | |
| 2008/0168294 A1 * | 7/2008 | Batson | H04N 21/2368 713/400 |
| 2008/0168470 A1 * | 7/2008 | Bushell | G06F 9/52 719/313 |
| 2008/0215317 A1 | 9/2008 | Fejzo | |
| 2008/0304573 A1 * | 12/2008 | Moss | H04N 21/2368 375/240.28 |
| 2009/0040997 A1 * | 2/2009 | Oh | H04N 21/4347 370/345 |
| 2009/0279572 A1 | 11/2009 | Takada | |
| 2009/0319283 A1 | 12/2009 | Schnell | |
| 2010/0153122 A1 * | 6/2010 | Wang | G10L 19/173 704/501 |
| 2010/0201824 A1 | 8/2010 | Wei | |
| 2010/0208079 A1 | 8/2010 | Wei | |
| 2012/0065983 A1 | 3/2012 | Ekstrand | |
| 2012/0239407 A1 | 9/2012 | Lynch | |
| 2012/0281859 A1 | 11/2012 | Villemoes | |
| 2013/0064383 A1 | 3/2013 | Schnell | |
| 2013/0128953 A1 | 5/2013 | Sonoda | |
| 2013/0182870 A1 | 7/2013 | Villemoes | |
| 2013/0226570 A1 | 8/2013 | Multrus | |
| 2013/0321702 A1 * | 12/2013 | Ruan | H04N 21/4307 348/515 |
| 2013/0322462 A1 | 12/2013 | Poulsen | |
| 2013/0336412 A1 * | 12/2013 | Erofeev | G11B 27/031 375/240.28 |
| 2014/0032226 A1 * | 1/2014 | Raju | G10L 19/008 704/500 |
| 2014/0365231 A1 | 12/2014 | Hoerich | |
| 2015/0172678 A1 | 6/2015 | Alshina | |
| 2015/0332707 A1 | 11/2015 | Disch | |
| 2016/0055855 A1 | 2/2016 | Kjoerling | |
| 2016/0055864 A1 | 2/2016 | Purnhagen | |
| 2016/0196831 A1 * | 7/2016 | Groeschel | G10L 19/008 381/97 |

FOREIGN PATENT DOCUMENTS

| | | |
|---|---|---|
| KR | 2008-0034812 | 4/2008 |
| KR | 2009-0062726 | 6/2009 |

OTHER PUBLICATIONS

Den Brinker, A.C. et al "An Overview of the Coding Standard MPEG-4 Audio Amendments 1 and 2: HE-AAC, SSC, and HE-AAC v2" EURASIP Journal on Audio, Speech, and Music Processing, vol. 2009, pp. 744-721, Jan. 1, 2009.
International Standard "ISO/IEC 14496-3:2001—Subpart 4: General Audio Coding" Jan. 1, 2001, pp. 1-313.
ITU, Recommendation I.T.U.R.B.S. "Audio Coding for Digital Terrestrial Television Broadcasting" 2001, pp. 1-133.
Meltzer, S. et al "MPEG-4 HE-AAC v2 Audio Coding for Today's Digital Media World" Jan. 31, 2006, pp. 1-12, internet citation.
Neuendorf, et al "MPEG Unified Speech and Audio Coding—The ISO/MPEG Standard for High-Efficiency Audio Coding of All Content Types" 132nd AES Convention, Apr. 2012, pp. 1-22.

\* cited by examiner

AUDIO DECODER UTILIZING SAMPLE RATE CONVERSION FOR FRAME SYNCHRONIZATION

CROSS-REFERENCE TO RELATED APPLICATIONS

This divisional application claims priority to U.S. application Ser. No. 14/779,170 filed Sep. 22, 2015, which is issued as U.S. Pat. No. 9,911,434 on Mar. 6, 2018, which is a 371 National Phase Entry of PCT International Application No. PCT/EP2014/056848 filed Apr. 4, 2014 which claims priority to U.S. Provisional Patent Application No. 61/808,701 filed 5 Apr. 2013 which is hereby incorporated by reference in its entirety.

TECHNICAL FIELD

The invention disclosed herein generally relates to audiovisual media distribution. In particular, it relates to an audio decoder adapted to accept multiple audio frame lengths and thus suitable to form part of a media decoder handling a frame-synchronous audiovisual media format.

BACKGROUND

Audio and video frame rates (or frame frequencies) used in most commercial applications available today follow separate established industry standards manifesting themselves both in recording and playback software products, hardware components as well as agreed formats for transmitting audio and video between communicating parties. Audio frame rates are typically specific to different coding algorithms and associated with audio sampling frequencies, such as 44.1 and 48 kHz, which are as notorious as the video frame rates 29.97 fps (NTSC) and 25 fps (PAL) in their respective geographical areas; further standard video frame rates include 23.98, 24 and 30 fps, or in a more generalized form 24, 25, 30 fps and (24, 25, 30)×1000/1001 fps. Attempts to unite or harmonize audio frame rates have not yet been successful despite the shift from analogue to digital distribution, which implies that an audio frame (e.g., a packet or a coding unit suitable for transmission over a network) does not in general correspond to an integer number of video frames.

The need to synchronize audiovisual data streams arises continually, as a result of clock drift or when several streams are received from different sources for common processing, editing or splicing in a server, a situation frequently encountered in broadcast stations. In the situation illustrated in FIG. 3, audio frames (A11, A12, . . . in stream S1 and A21, A22, . . . in stream S2) and video frames (V11, V12, . . . in stream S1 and V21, V22, . . . in stream S2) do not match, an attempt to improve the video-to-video synchronicity between the streams by duplicating or rejecting video frames in one of the streams (in an attempt to e.g. splice the streams) typically leads to an audio-to-video asynchronicity within that stream. In general, the asynchronicity persists—at least to some extent—even if corresponding audio frames are deleted or duplicated.

At the cost of more processing, a larger room for maneuver could be created by temporarily decoding the audio during synchronization into a low-level format that is independent of the division into frames, e.g., baseband format, or pulse-code modulation (PCM) resolved at the original sampling frequency. Such decoding however blurs the exact anchoring of metadata to specific audio segments and creates an information loss that cannot be remedied by decoding into a 'perfect' intermediate format. As one example, dynamic range control (DRC) is typically mode-dependent and equipment-dependent, and can therefore be consumed only at the moment of actual playback; a data structure governing the characteristics of DRC throughout an audio packet is difficult to restore faithfully after synchronization has taken place. Hence, the task of preserving metadata of this type past consecutive decoding, synchronization and encoding stages is no simple task if subjected to complexity constraints.

Even more serious difficulties may arise in connection with legacy infrastructure that is designed to carry two-channel PCM signals and is therefore capable of handling multi-channel content only in coded form.

It is certainly more convenient to encode audio and video data frame-synchronously in the sense that data in a given frame exactly correspond to the same time segment in the recorded and coded audiovisual signal. This preserves audio-to-video synchronicity under frame-wise manipulation of an audiovisual stream, i.e., duplication or rejection of one or more entire independent coding units in the stream. The frame lengths available in the Dolby ETM audio format match video frame lengths. With a typical bit rate of 448 kbps, this format was designed primarily for the purpose of professional production, with hard media like digital videocassettes as its preferred storage modality.

There is a need for an alternative audio format suitable for distribution purposes as part of a frame-synchronous audiovisual format (or format family), as well as coding and decoding equipment suitable for use therewith.

BRIEF DESCRIPTION OF THE DRAWINGS

In what follows, example embodiments will be described in greater detail and with reference to the accompanying drawings, on which.

All the figures are schematic and generally only show parts which are necessary in order to elucidate the invention, whereas other parts may be omitted or merely suggested. Unless otherwise indicated, like reference numerals refer to like parts in different figures.

DETAILED DESCRIPTION

I. Overview

Figure 1:
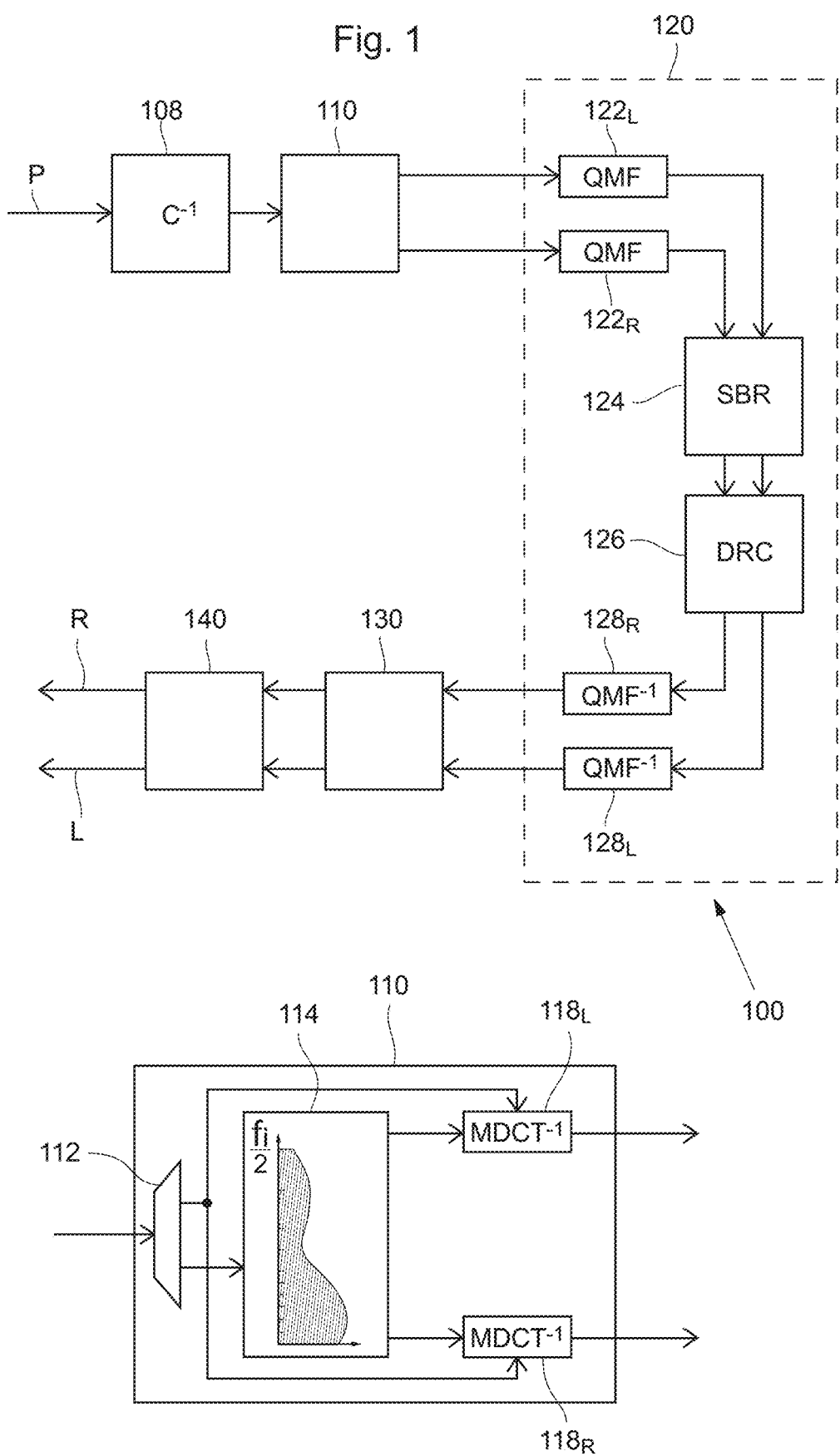
FIG. 1 shows the structure of an audio processing system according to an example embodiment as well as the inner workings of a component in the system.

An audio processing system accepts an audio bitstream segmented into frames carrying audio data. The audio data may have been prepared by sampling a sound wave and transforming the electronic time samples thus obtained into spectral coefficients, which are then quantized and coded in a format suitable for transmission or storage. The audio processing system is adapted to reconstruct the sampled sound wave, in a single-channel, stereo or multi-channel format. The audio data in a frame may be self-contained in the sense of being sufficient as basis for reconstructing an additional time interval of the sound wave that the audio data represent; the reconstruction may or may not require knowledge of preceding audio data due to overlapped transforms and the like.

The audio processing system comprises at least a front-end component, a processing stage and a sample rate converter for providing a time-domain representation of the processed audio signal at a desired target sampling frequency. It is emphasized that the target sampling frequency is a predefined quantity, which is configurable by a user or system designer independently of the properties (e.g., the audio frame rate) of the incoming audio bitstream. As one option, the target sampling frequency may be a function of the audio frame rate. As another option, the target sampling frequency may be constant and/or non-adaptive with respect to the audio frame rate.

In the front-end component, a dequantization stage receives a number of quantized spectral coefficients from the audio bitstream, wherein the number corresponds to one audio frame, jointly processes the coefficients to produce information for controlling inverse quantization of the audio data in a frame and executes the inverse quantization. Downstream of the dequantization stage in the front-end component, an inverse transform stage takes the output—spectral coefficients constituting a first frequency-domain representation of an intermediate signal—and synthesizes a time-domain representation of the intermediate signal. The front-end component then receives and processes an equal number of subsequent quantized spectral coefficients (which may however be distributed over several transforms) from the audio bitstream and goes on to process these coefficients. The dequantization stage is configured to generate the spectral coefficients by decoding the audio data into predetermined quantization levels (or reconstruction levels, or reconstruction points). The quantization levels have been chosen by the encoder based on psychoacoustic considerations, e.g., in such manner that the quantization noise for a given frequency (or frequency band) does not exceed the masking threshold. Because the masking threshold is frequency-dependent, it is preferred from an economical point of view to have the encoder select quantization levels that are non-uniform with respect to frequency. As a consequence, quantization and dequantization typically take place with a particular physical sampling frequency in mind, at which the optimal output is produced.

The processing stage in the audio processing system may be adapted to perform processing in the frequency domain. For this purpose, the processing stage comprises an initial analysis filterbank for providing a frequency-domain representation of the intermediate signal, and one or more processing components followed by a synthesis filterbank for transforming the processed audio signal back into the time domain.

In an example embodiment, the audio processing system is configured to accept an audio bitstream having any one of at least two different predefined audio frame rates. This allows the audio processing system to operate on an audio bitstream that is associated with a stream of video frames in the sense that each video frame is temporally related to an audio frame carrying audio data of duration equal to that of one or more video frames, preferably one or more full video frames, so that two or more different video frame rates can be matched without sacrificing audio-to-video synchronicity in the audio processing system. As used herein, the "duration" of a video frame (in seconds) may be understood as the inverse of the video frame rate. Similarly, the duration of an audio frame (in seconds) may be defined as the inverse of the audio frame rate. The video data in a frame may result from sampling at an initial, intermediate or final instant of the interval in which the related audio data were sampled; alternatively, the video data were sampled over an extended interval (e.g., by a rolling-shutter process) overlapping at least partially with the audio sampling interval. The front-end component has variable maximal frame length (measured as the number of samples) and is operable in at least two modes corresponding to said predefined audio frame rates.

The audio processing system achieves the desired frame-rate adaptability because it is able to select a relatively greater frame length (or maximal frame length, account taken of possible subdivisions, see below) for a relatively lower audio frame rate and vice versa. In a critically sampled system, the physical sampling frequency corresponds to the ratio of the physical duration of an audio frame to the number of spectral coefficients contained therein. The dequantization stage and the inverse transform stage need not be aware of the physical duration of the coefficients in a frame, only that the coefficients belong to the same frame. Because the variation of the resulting internal sampling frequency (in physical units) can be kept within boundaries—or even approximately constant—by varying the frame length in the front-end component, the resampling factor used in the final sampling rate conversion will be close to one, and the non-constancy of the internal sampling frequency will typically not lead to any perceptible degradation of the audio. In different words, the slight up- or down-sampling of the the front-end stage's output, which was produced to be optimal at a sampling frequency differing slightly from the target sampling frequency, will not be psychoacoustically significant. Furthermore, the analysis and synthesis filterbanks in the processing stage need not be adaptable (e.g., to respond to a change in the audio frame rate in the audio bitstream received by the audio processing system) but may have a fixed number of frequency bands An audio processing system with the characteristics outlined above is adapted to handle an audio format responding to the previously mentioned need for a frame-synchronous audio distribution format. By way of example, the bit rate needed to transmit a stereo signal or other two-channel audio signal may be less than 200 kpbs, such as less than 100 kpbs.

In an example embodiment, one of the modes in which the front-end component is operable is used for two or more of the predefined audio frame rates. For instance, audio frame rates differing by at most 5% from one another (or put differently, audio frame rates differing by at most 2.5% from a design frame rate) will not correspond to a very large variation in physical sampling frequency. Hence, the output produced by the front-end component, the spectral coefficients possibly resulting from the encoder's strategic bit allocation to suit a particular sampling frequency, will be robust against a sampling rate conversion that effectively shifts all frequency bands by up to e.g. 5%.

Another way to describe this is that the front end component, in particular the dequantization stage, when it applies the instructions received from the encoder side in the bitstream, will be adapted to produce optimal audio output for a particular physical sampling frequency. The inventors have realized that some amount of mismatch between the intended physical sampling frequency of the front-end component and the physical sampling frequencies to which any components downstream thereof are tuned is tolerable as long as the deviation is limited.

It is common practice in audio coding to vary the frame length (or transform window length, or block size) adaptively, wherein typically a relatively larger frame length is used for audio signals with stationary characteristics, for which fine frequency resolution is preferred over time resolution, and a relatively smaller frame length is used for transients. In an example embodiment, the front-end component is operable, in addition to a predefined maximal frame length, at an alternative frame length being a fraction of the maximal frame length. For instance, the alternative frame length may comprise ½, ⅓, ¼, ⅙, ⅛, 1/16 of the number of samples in a frame of the maximal length.

In an example embodiment, the audio processing system described above is combined with a video processing system into a multimedia processing system accepting a frame-synchronous multimedia bitstream and outputting processed video frames. The multimedia bitstream may comprise an audio bitstream and a stream of video frames associated with the audio bitstream in the sense that each video frame is temporally related to a frame in the audio bitstream. The temporal relationship between audio and video frames may be one-to-one, one-to-many or many-to-one. This allows the multimedia processing system to perform simultaneous duplication or deletion of audio and video frames in a frame-synchronous manner, that is, without disturbing the audio-to-video synchronicity in a multimedia stream. As already noted, this facilitates operations such as splicing of two multimedia streams. If two multimedia streams in a frame-synchronous format are to be spliced, it will always be safe to use the frame boundaries as splicing points. Still within the scope of the invention, the multimedia processing system may accept two or more multimedia streams from different sources, e.g., live recording sites, radio or network receivers, or storage media.

In an example embodiment, an audio processing method inputs an audio bitstream associated with a stream of video frames, wherein the audio bitstream is segmented into frames and each video frame is temporally related to a frame in the audio bitstream which carries associated audio data of equal duration as one or more video frames, and outputs a reconstructed audio signal. The method comprises:
 establishing a current frame rate of the audio bitstream;
 repeatedly receiving quantized spectral coefficients corresponding to one audio frame in the audio bitstream and performing inverse quantization followed by a frequency-to-time transformation, whereby a representation of an intermediate audio signal is obtained;
 performing at least one processing step in the frequency domain on the intermediate audio signal; and
 changing the sampling rate of the processed audio signal into a target sampling frequency, whereby a time-domain representation of a reconstructed audio signal is obtained.

In this example embodiment, the second step (inverse quantization and frequency-to-time transformation) is performed in a functional component, such as a software module or a component in a dequantization and synthesis circuit, that is operable in at least two modes, each mode having a different maximal frame length. The mode in which to operate the functional component is selected in response to the current frame rate of the audio bitstream, wherein two different frame rate values give rise to different operating modes of the functional component.

An audio processing method with the above characteristics is adaptable to a variety of audio frame rates. It is not necessary to perform the inverse quantization in the same functional component referred to previously, nor in a functional component responding to audio frame rate changes as all; indeed, the inverse quantization may be performed in a functional component being of a static (or single-mode) type in the sense that it does not adapt particularly to audio frame rate changes.

In an example embodiment, there is provided a computer program product comprising a computer-readable transitory or non-transitory medium with instructions for performing the above audio processing method.

In a second aspect, the invention provides an alternative solution to the problem of processing audio bitstreams with one of several admissible frame rates. In an example embodiment, an audio processing system is configured to accept an audio bitstream associated with a stream of video frames, the audio bitstream being segmented into frames, wherein each video frame is temporally related to a frame in the audio bitstream which carries associated audio data of equal duration as one or more video frames. The audio processing system comprises:
 a front-end component which includes:
  a dequantization stage adapted to repeatedly receive quantized spectral coefficients corresponding to one audio frame in the audio bitstream, and to output a first frequency-domain representation of an intermediate signal; and
  an inverse transform stage for receiving the first frequency-domain representation of the intermediate signal and synthesizing, based thereon, a time-domain representation of the intermediate signal;
 a processing stage comprising:
  an analysis filterbank for receiving the time-domain representation of the intermediate signal and outputting a second frequency-domain representation of the intermediate signal;
  at least one processing component for receiving said frequency-domain representation of the intermediate signal and outputting a frequency-domain representation of a processed audio signal; and
  a synthesis filterbank for receiving the frequency-domain representation of the processed audio signal and outputting a time-domain representation of the processed audio signal; and
 a sample rate converter for receiving said time-domain representation of the processed audio signal and outputting a reconstructed audio signal sampled at a target sampling frequency.

According to this example embodiment, the front-end component may have fixed frame length. When the front-end component processes quantized spectral coefficients corresponding to different frame durations (or equivalently, different frame rates) but equal frame length, the sample rate converter may restore the physical sampling frequency of the output of the audio processing system to the desired target physical sampling frequency. Like in the previous example embodiments, the adaptability to different frame rates is achieved by accepting a limited mismatch between the physical sampling frequency presupposed by the front-end component (or more precisely, presupposed by the entity preparing the control data it receives) and the physical sampling frequency of the reconstructed audio signal.

A further aspect of the present invention provides an encoder system and an encoding method suitable for preparing an audio bitstream to be decoded by any of the audio processing systems outlined above.

It is noted that unless otherwise indicated, the invention relates to all combinations of features, even if they are recited in mutually different claims.

II. Example Embodiments

FIG. 1 is a generalized block diagram of an audio processing system 100 receiving an encoded audio bitstream P and with a reconstructed audio signal, shown as a pair of stereo baseband signals L, R in FIG. 1, as its final output. In this example it will be assumed that the bitstream P comprises quantized, transform-coded two-channel audio data. The audio processing system 100 may receive the audio bitstream P from a communication network, a wireless receiver or a memory (not shown). The output of the system 100 may be supplied to loudspeakers for playback, or may be re-encoded in the same or a different format for further transmission over a communication network or wireless link, or for storage in a memory. The audio processing system 100 comprises a decoder 108 for decoding the bitstream P into quantized spectral coefficients and control data. A front-end component 110, the structure of which will be discussed in greater detail below, dequantizes these spectral coefficients and supplies a time-domain representation of an intermediate audio signal to be processed by the processing stage 120. The intermediate audio signal is transformed by analysis filterbanks $122_L$, $122_R$ into a second frequency domain, different from the one associated with the coding transform previously mentioned; the second frequency-domain representation may be a quadrature mirror filter (QMF) representation, in which case the analysis filterbanks $122_L$, $122_R$ may be provided as QMF filterbanks. Downstream of the analysis filterbanks $122_L$, $122_R$, a spectral band replication (SBR) module 124 responsible for high-frequency reconstruction and a dynamic range control (DRC) module 126 process the second frequency-domain representation of the intermediate audio signal. Downstream thereof, synthesis filterbanks $128_L$, $128_R$ produce a time-domain representation of the audio signal thus processed. As the skilled person will realize after studying this disclosure, neither the spectral band replication module 124 nor the dynamic range control module 126 are necessary elements of the invention; to the contrary, an audio processing system according to a different example embodiment may include additional or alternative modules within the processing stage 120. Downstream of the processing stage 120, a sample rate converter 130 is operable to adjust the sampling rate of the processed audio signal into a desired audio sampling rate, such as 44.1 kHz or 48 kHz, for which the intended playback equipment (not shown) is designed. It is known per se in the art how to design a sample rate converter 130 with a low amount of artefacts in the output. The sample rate converter 130 may be deactivated at times where this is not needed—that is, where the processing stage 120 supplies a processed audio signal that already has the target sampling frequency. An optional signal limiting module 140 arranged downstream of the sample rate converter 130 is configured to limit baseband signal values as needed, in accordance with a no-clip condition, which may again be chosen in view of particular intended playback equipment.

As shown in the lower portion of FIG. 1, the front-end component 110 comprises, a dequantization stage 114, which can be operated in one of several modes with different block sizes, and an inverse transform stage $118_L$, $118_R$, which can operate on different block sizes too. Preferably, the mode changes of the dequantization stage 114 and the inverse transform stage $118_L$, $118_R$ are synchronous, so that the block size matches at all points in time. Upstream of these components, the front-end component 110 comprises a demultiplexer 112 for separating the quantized spectral coefficients from the control data; typically, it forwards the control data to the inverse transform stage $118_L$, $118_R$ and forwards the quantized spectral coefficients (and optionally, the control data) to the dequantization stage 114. The dequantization stage 114 performs a mapping from one frame of quantization indices (typically represented as integers) to one frame of spectral coefficients (typically represented as floating-point numbers). Each quantization index is associated with a quantization level (or reconstruction point). Assuming that the audio bitstream has been prepared using non-uniform quantization, as discussed above, the association is not unique unless it is specified what frequency band the quantization index refers to. Put differently, the dequantization process may follow a different codebook for each frequency band, and the set of codebooks may vary as a function of the frame length and/or bitrate. In FIG. 1, this is schematically illustrated, wherein the vertical axis denotes frequency and the horizontal axis denotes the allocated amount of coding bits per unit frequency. Note that the frequency bands are typically wider for higher frequencies and end at one half of the internal sampling frequency $f_i$. The internal sampling frequency may be mapped to a numerically different physical sampling frequency as a result of the resampling in the sample rate converter 130; for instance, an upsampling by 4.3% will map $f_i$=46.034 kHz to the approximate physical frequency 48 kHz and will increase the lower frequency band boundaries by the same factor. As FIG. 1 further suggests, the encoder preparing the audio bitstream typically allocates different amounts of coding bits to different frequency bands, in accordance with the complexity of the coded signal and expected sensitivity variations of the human hearing sense.

Quantitative data characterizing the operating modes of the audio processing system 100, and particularly the front-end component 110, are given in table 1.

TABLE 1

Example operating modes a-m of audio processing system

| Mode | Frame rate [Hz] | Frame duration [ms] | Frame length in front-end component [samples] | Bin width in front-end component [Hz] | Internal sampling frequency [kHz] | Analysis filterbank [bands] | Width of analysis frequency band [Hz] | SRC factor | External sampling frequency [kHz] |
|---|---|---|---|---|---|---|---|---|---|
| a | 23.976 | 41.708 | 1920 | 11.988 | 46.034 | 64 | 359.640 | 0.9590 | 48.000 |
| b | 24.000 | 41.667 | 1920 | 12.000 | 46.080 | 64 | 360.000 | 0.9600 | 48.000 |
| c | 24.975 | 40.040 | 1920 | 12.488 | 47.952 | 64 | 374.625 | 0.9990 | 48.000 |
| d | 25.000 | 40.000 | 1920 | 12.500 | 48.000 | 64 | 375.000 | 1.0000 | 48.000 |
| e | 29.970 | 33.367 | 1536 | 14.985 | 46.034 | 64 | 359.640 | 0.9590 | 48.000 |

TABLE 1-continued

Example operating modes a-m of audio processing system

| Mode | Frame rate [Hz] | Frame duration [ms] | Frame length in front-end component [samples] | Bin width in front-end component [Hz] | Internal sampling frequency [kHz] | Analysis filterbank [bands] | Width of analysis frequency band [Hz] | SRC factor | External sampling frequency [kHz] |
|---|---|---|---|---|---|---|---|---|---|
| f | 30.000 | 33.333 | 1536 | 15.000 | 46.080 | 64 | 360.000 | 0.9600 | 48.000 |
| g | 47.952 | 20.854 | 960 | 23.976 | 46.034 | 64 | 359.640 | 0.9590 | 48.000 |
| h | 48.000 | 20.833 | 960 | 24.000 | 46.080 | 64 | 360.000 | 0.9600 | 48.000 |
| i | 50.000 | 20.000 | 960 | 25.000 | 48.000 | 64 | 375.000 | 1.0000 | 48.000 |
| j | 59.940 | 16.683 | 768 | 29.970 | 46.034 | 64 | 359.640 | 0.9590 | 48.000 |
| k | 60.000 | 16.667 | 768 | 30.000 | 46.080 | 64 | 360.000 | 0.9600 | 48.000 |
| l | 120.000 | 8.333 | 384 | 60.000 | 46.080 | 64 | 360.000 | 0.9600 | 48.000 |
| m | 25.000 | 40.000 | 3840 | 12.500 | 96.000 | 128 | 375.000 | 1.0000 | 96.000 |

The emphasized columns in table 1 contain values of controllable quantities, whereas the remaining quantities may be regarded as dependent on these. It is furthermore noted that the ideal values of the resampling (SRC) factor are $(^{24}/_{25})\times(1000/1001)\approx 0.9560$, $^{24}/_{25}=0.96$ and $1000/1001\approx 0.9990$. The SRC factor values listed in table 1 are rounded, as are the frame rate values. The resampling factor 1.000 is exact and corresponds to the SRC 130 being deactivated or entirely absent. In example embodiments, the audio processing system 100 is operable in at least two modes with different frame lengths, one or more of which may coincide with the entries in table 1.

Modes a-d, in which the frame length of the front-end component is set to 1920 samples, are used for handling (audio) frame rates 23.976, 24.000, 24.975 and 25.000 Hz, selected to exactly match video frame rates of widespread coding formats. Because of the different frame lengths, the internal sampling frequency (frame rate×frame length) will vary from about 46.034 kHz to 48.000 kHz in modes a-d; assuming critical sampling and evenly spaced frequency bins, this will correspond to bin width values in the range from 11.988 Hz to 12.500 Hz (half internal sampling frequency/frame length). Because the variation in internal sampling frequencies is limited (it is about 5%, as a consequence of the range of variation of the frame rates being about 5%), it is judged that the audio processing system 100 will deliver a reasonable output quality in all four modes a-d despite the non-exact matching of the physical sampling frequency for which incoming audio bitstream was prepared.

Continuing downstream of the front-end component 110, the analysis (QMF) filterbank 122 has 64 bands, or 30 samples per QMF frame, in all modes a-d. In physical terms, this will correspond to a slightly varying width of each analysis frequency band, but the variation is again so limited that it can be neglected; in particular, the SBR and DRC processing modules 124, 126 may be agnostic about the current mode without detriment to the output quality. The SRC 130 however is mode dependent, and will use a specific resampling factor—chosen to match the quotient of the target external sampling frequency and the internal sampling frequency—to ensure that each frame of the processed audio signal will contain a number of samples corresponding to a target external sampling frequency of 48 kHz in physical units.

In each of the modes a-d, the audio processing system 100 will exactly match both the video frame rate and the external sampling frequency. The audio processing system 100 may then handle the audio parts of multimedia bitstreams T1 and T2 in FIG. 4, where audio frames A11, A12, A13, . . . ; A22, A23, A24, . . . and video frames V11, V12, V13, . . . ; V22, V23, V24 coincide in time within each stream. As suggested in FIG. 4, it is then possible to improve the synchronicity of the streams T1, T2 by deleting an audio frame and an associated video frame in the leading stream. Alternatively, an audio frame and an associated video frame in the lagging stream are duplicated and inserted next to the original position, possibly in combination with interpolation measures to reduce perceptible artefacts.

Modes e and f, intended to handle frame rates 29.97 Hz and 30.00 Hz, can be discerned as a second subgroup. As already explained, the quantization of the audio data is adapted (or optimized) for an internal sampling frequency of about 48 kHz. Accordingly, because each frame is shorter, the frame length of the front-end component 110 is set to the smaller value 1536 samples, so that internal sampling frequencies of about 46.034 and 46.080 kHz result. If the analysis filterbank 122 is mode-independent with 64 frequency bands, each QMF frame will contain 24 samples.

Similarly, frame rates at or around 50 Hz and 60 Hz (corresponding to twice the refresh rate in standardized television formats) and 120 Hz are covered by modes g-i (frame length 960 samples), modes j-k (frame length 768 samples) and mode l (frame length 384 samples), respectively. It is noted that the internal sampling frequency stays close to 48 kHz in each case, so that any psychoacoustic tuning of the quantization process by which the audio bitstream was produced will remain at least approximately valid. The respective QMF frame lengths in a 64-band filterbank will be 15, 12 and 6 samples. As mentioned, the audio processing system 100 may be operable to subdivide audio frames into shorter subframes; reasons for doing this may be to capture audio transients more efficiently. For a 48 kHz sampling frequency and the settings given in table 1, below tables 2-4 show the bin widths and frame lengths resulting from subdivision into 2, 4, 8 (see audio frame A29 in FIGS. 4) and 16 subframes. It is believed that the settings according to table 1 achieve an advantageous balance of time and frequency resolution.

TABLE 2

Time/frequency resolution at frame length 2048 samples

| | Number of subframes | | | | |
|---|---|---|---|---|---|
| | 1 | 2 | 4 | 8 | 16 |
| Number of bins | 2048 | 1024 | 512 | 256 | 128 |
| Bin width [Hz] | 11.72 | 23.44 | 46.88 | 93.75 | 187.50 |
| Frame duration [ms] | 42.67 | 21.33 | 10.67 | 5.33 | 2.67 |

TABLE 3

Time/frequency resolution at frame length 1920 samples

| | Number of subframes | | | | |
|---|---|---|---|---|---|
| | 1 | 2 | 4 | 8 | 16 |
| Number of bins | 1920 | 960 | 480 | 240 | 120 |
| Bin width [Hz] | 12.50 | 25.00 | 50.00 | 100.00 | 200.00 |
| Frame duration [ms] | 40.00 | 20.00 | 10.00 | 5.00 | 2.50 |

TABLE 4

Time/frequency resolution at frame length 1536 samples

| | Number of subframes | | | | |
|---|---|---|---|---|---|
| | 1 | 2 | 4 | 8 | 16 |
| Number of bins | 1536 | 768 | 384 | 192 | 96 |
| Bin width [Hz] | 15.63 | 31.25 | 62.50 | 125.00 | 250.00 |
| Frame duration [ms] | 32.00 | 16.00 | 8.00 | 4.00 | 2.00 |

Decisions relating to subdivision of a frame may be taken as part of the process of preparing the audio bitstream, such as in an audio encoding system (not shown).

As illustrated by mode m in table 1, the audio processing system 100 may be further enabled to operate at an increased external sampling frequency of 96 kHz and with 128 QMF bands, corresponding to 30 samples per QMF frame. Because the external sampling frequency incidentally coincides with the internal sampling frequency, the SRC factor is unity, corresponding to no resampling being necessary.

Figure 2:
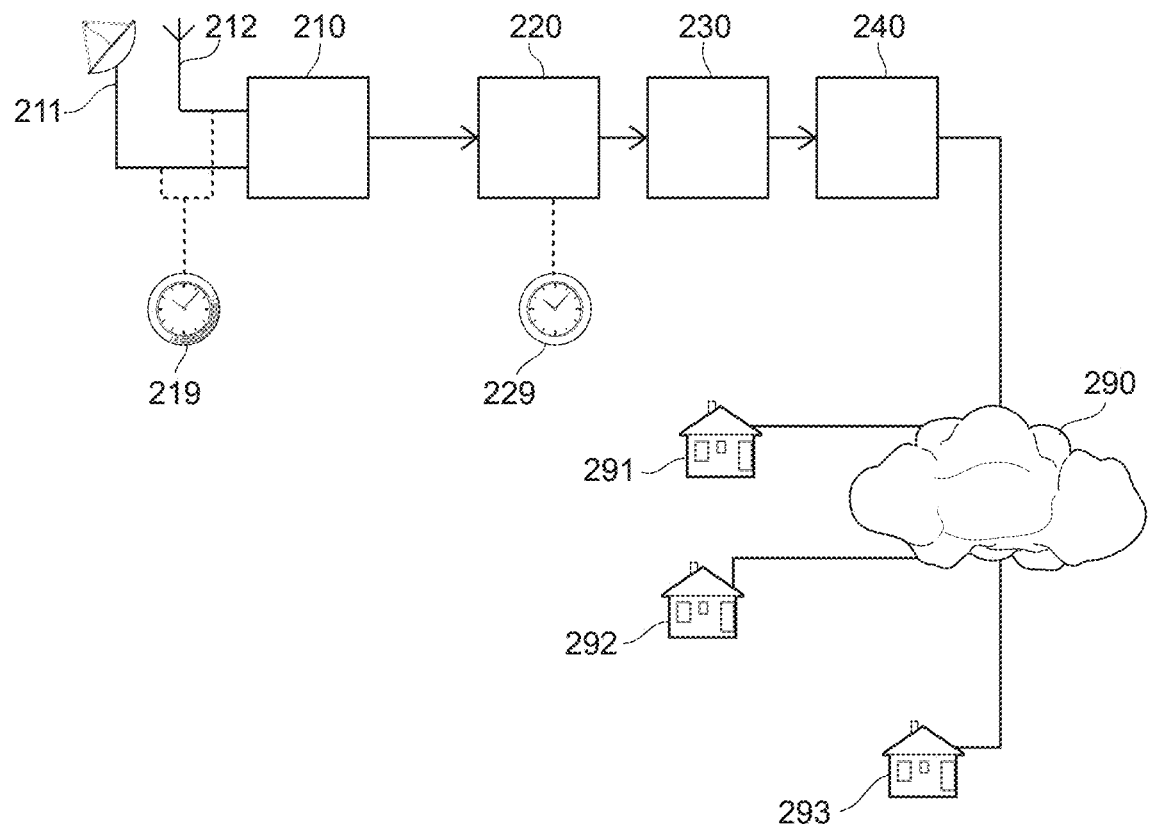
FIG. 2 shows a media distribution system.

FIG. 2 shows a media distribution system comprising a reception site 210, which may comprise a satellite receiver 211 and/or radio-frequency receiver 212, which may be provided as components in an integrated receiver and decoder (IRD). Multimedia bitstreams carrying audio and video data are received at the reception site 210. The multimedia bitstreams comprise timestamps which define a local time 219 of the bitstream content, e.g., a local time at a sampling device. The received and possibly decoded multimedia bitstreams are then transmitted to a turnaround site 220, at which content routing and management may take place. Some turnaround sites 220 do not perform any decoding. The audio part of the multimedia bitstream may for instance be formatted in accordance with a version of the industry standard SMPTE 337 defined by the Society of Motion Picture and Television Engineers. This format is advantageous to use because it includes time alignment information allowing the data to be synchronized with information content delivered over other interfaces; other formats with such properties may replace SMPTE 337 in this use.

A local time 229 at the turnaround site 220 may be defined by a local reference clock or a network reference time common to the turnaround site 220 and the downstream entities. Ideally, the local time 219 of the content and the local time 229 at the turnaround site 220 are equal but may in practice differ as a result of clock drift, at which point a need to synchronize the received multimedia bitstreams arises. More precisely, in an implementation where the turnaround processing is done on HD-SDI (high definition serial digital interface) level, decompressed video is carried in frames that still comprise the conventionally unused HANC and VANC (horizontal and vertical ancillary data) spaces. The HANC and VANC spaces are used to transport the encoded audio data. In this implementation, the only relative timing information between the audio and video data is given implicitly by the arrangement of the audio data in specific frames of the HD-SDI signal. Supposing that the audio is not framed in a synchronous manner, the repetition or dropping of an HD-SDI frame would not return any information on the duration (or localization in time) of the audio data repeated/dropped together with that video frame; adjacent HD-SDI frames may be corrupted as well if the repetition/dropping causes them to contain fragments of audio frames that cannot be restored into complete audio frames by relying on the next or preceding HD-SDI frame. Frame-synchronous audio coding avoids this failure, since it does not allow for anything by repeating/dropping audio and video data of equal physical duration, and indeed complete frames thereof.

Splicing plural multimedia bitstreams, e.g., between different content objects or between content and advertisement material, is a further example situation in which frame synchronicity is very useful. Indeed, this will ensure that each frame codes corresponding and time-synchronous portions of audio and video data, so that it is always safe to interrupt or begin a bitstream between two consecutive frames; the frame boundaries may therefore be used as splicing points.

Downstream of the turnaround site 220, there may be arranged a serial digital interface (SDI) router 230 and then a video encoder paralleled by an audio pass-through component, collectively indicated by reference number 240. The SDI router 230 may for example be in accordance with the standard-definition or high-definition formats standardized as SMPTE 259M and SMPTE 292M, respectively. The transcoded audiovisual data supplied from the video encoder and audio pass-through component 240 are then transmitted over a wired or wireless communication network 290 to consumers 291, 292, 293.

Figure 3:
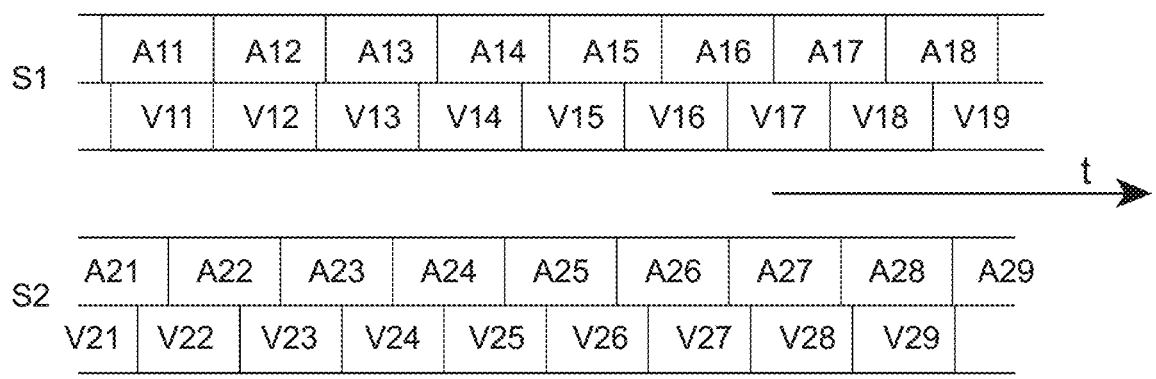
FIG. 3 shows two multimedia streams, each comprising an audio bitstream and an associated stream of video frames, with independent frame lengths according to prior art.
Figure 4:
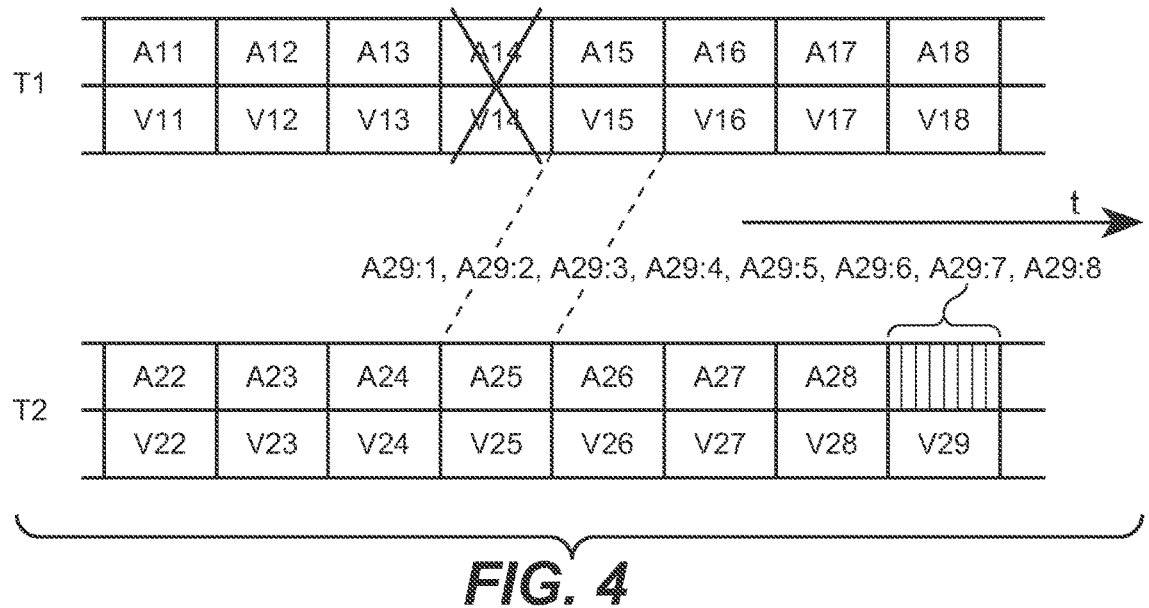
FIG. 4 shows two multimedia streams, each comprising an audio bitstream and an associated stream of video frames, with coordinated frame lengths in accordance with an example embodiment.

FIGS. 3 and 4 have already been discussed.

Referring to the second aspect of the present invention, it is envisaged to provide an alternative audio processing system with the same general characteristics of the audio processing system 100 shown in FIG. 1, however, without necessarily any multimode abilities of the front-end component. As such, depending on the (permanent) settings of its front-end component, the alternative audio processing system is operable in either modes a-d or in modes e-f or in minds g-i or in modes j-k. The adaptability of the alternative audio processing system is due primarily to the SRC. The front-end component processes samples in each frame without necessarily knowing (or at least without adapting to) its physical duration, which may vary. Accordingly, the physical sampling frequency may vary, however, without significant adverse psychoacoustic side effects as long as the variation is bounded.

Figure 5:
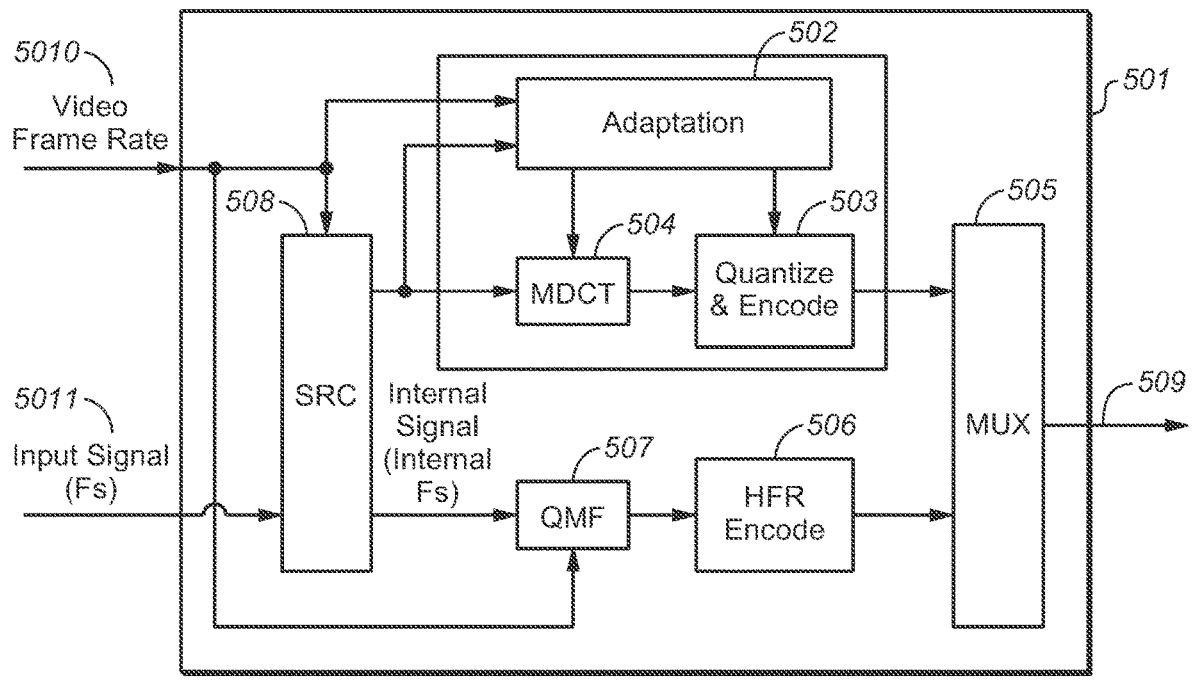
FIG. 5 shows the structure of an encoder system according to an example embodiment.

In FIG. 5, an encoder system 501 in accordance with an example embodiment is schematically depicted. The input signal 5011 has a sampling rate of Fs, which may be 48 kHz. Additionally input to the encoder is the video frame rate 5010, to which the audio frame rate should be aligned. The "Adaptation" module 502 adapts the system to a base transform size (or maximal frame length) to handle the required frame rate, and also subdivides this base transform size into smaller transforms as a function of the input signal characteristics (according to tables 2-4). The desired frame rate is additionally supplied to the sample rate converter (SRC) module 508, in order to provide an internal sampling rate (internal Fs) that enables the system to handle a multiple of different frame rates with a single base transform size. The base transform size is chosen to be optimal or at least advantageous from an audio coding perspective, i.e., it should be as long as possible (within reasonable limits) for stationary signals, such as 2048, 1920, 1536 MDCT lines for 48 kHz sampling rate, and is preferable sub-divisible into smaller transforms for transient passages, e.g., 8 or 16 transforms. According to the present example embodiment, the SRC module 508 is designed to be limited to provide an internal sampling rate that has a limited deviation from the external sampling rate so that it does not significantly change the physical time/frequency properties of the selected MDCT base transform sizes.

The MDCT module 504 transforms the input time domain signal of sampling rate "Internal Fs" into the frequency domain. The "Quantize & Encode" module 503 quantizes the MDCT lines according to a psychoacoustic model taking into account the human auditory system's variation in sensitivity and frequency resolution as a function of actual (physical) frequency. The "Quantize and Encode" module 503 can be adapted to do the quantization and psychoacoustics using the internal sampling frequency or the external sampling frequency. If the latter is selected, a deviation from the actual physical frequency will be present since the sampling rate converter is not taken into account. However, given the design of the system, this deviation is sufficiently small to make be neglected. Or put differently the psychoacoustics is apt to adapt to different ranges of sampling rates given a specific size of the MDCT, but the deviation of the internal sampling rate from the external sampling rate of the signal due to the sampling rate converter is sufficiently small to not fall outside of the range of the tuning parameters for the external sampling rates.

The "HFR encoder" 506, which relies on high-frequency reconstruction being enabled on the decoder side, operates on the subbands of a fixed QMF transform 507 of e.g. 64 subbands. Since the QMF filterbank for HFR encoding and decoding is always a fixed transform size (a pseudo-QMF as commonly used for HFR processing cannot have varying window-sequences and transform sizes like an MDCT), it is a benefit of the present example embodiment that it is able to maintain the QMF transform size fixed at 64 subbands for the majority of the relevant video/audio frame rates.

The HFR encoder 506 operates on groups of QMF samples, e.g. 32 samples for a 2048-sample frame at 48 kHz (64 subbands multiplied by 32 QMF samples equals 2048 time-domain samples). Given the proposed transform sizes and SRC factors outlined in Table 1, the HFR encoder 506 only needs to adapt the frame size according to the video frame rate, which is done by grouping QMF subband samples together in time slightly differently from the example of 32 samples outlined above, and the choice of SRC factor ensures that the number of QMF samples corresponding to a frame is an integer number (again as outlined in table 1.).

Further, the HFR encoder 506 typically groups the spectrum into broader bands, according to an approximation related to a Bark scale. From this perspective, it is an advantage of the present example embodiment that it keeps the number of QMF subbands constant, since groupings of subbands will not vary as a function of video frame rates.

The quantized spectrum from the MDCT, along with control data is muxed together, by multiplexer 505, to form the output audio bitstream.

In summary, the example embodiment shown in FIG. 5 provides an encoder system 501 (and indeed also the corresponding audio processing system 100 acting as decoder) that:

keeps the SRC factor close to one, to minimize the difference between the internal and external sampling rate;

uses MDCT base transform sizes that are known to work for audio coding, and that can be nicely divided into sub transforms to handle transients;

uses a minimum of different MDCT base transform size to simplify implementation, tuning and minimize signaling overhead from the encoder to the decoder; and includes a single fixed-size QMF filterbank with a number (64) of subbands that is known to work well for high-frequency reconstruction and similar algorithms, and that allows for grouping of an integer of QMF samples into a frame.

In a further development of the encoder system 501, the system may include bandwidth limiting components (not shown). Indeed, for a signal of input sampling rate of 48 kHz, such bandwidth limiting components may limit the audio bandwidth to e.g. 20 kHz, i.e., 4 kHz below the Nyquist frequency. This alleviates the design of the SRC 130 on the decoder side, since a less steep low pass filter can be used in the sampling rate conversion process.

III. Equivalents, Extensions, Alternatives and Miscellaneous

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. An audio processing system configured to process an audio bitstream carrying audio data temporally associated with a stream of video frames, the audio processing system comprising:
   a front-end component operating in a plurality of modes and configured to receive different audio bitstreams, each segmented into audio frames having different respective frame lengths, and having a variable maximal frame length, the front-end component selecting a frame length inversely related to an audio frame rate in a selected mode of the plurality of modes, wherein each mode has a different internal sampling frequency, a different audio frame rate, a controllable selected audio frame length different for each mode, and a pre-assigned mode-specific resampling factor associated with each mode, and wherein the selecting achieves a desired frame-rate adaptability by selecting a greater frame length for a lower audio frame rate, or a lower frame length for a greater audio frame rate;
   a processor adapted to output a first time-domain representation of an intermediate signal using the selected mode of the plurality of modes;
   an analysis filterbank for receiving the first time-domain representation of the intermediate signal and outputting a second frequency-domain representation of the intermediate signal;
   at least one processing component for receiving said second frequency-domain representation of the intermediate signal and outputting a frequency-domain representation of a processed audio signal;
   a synthesis filterbank for receiving the frequency-domain representation of the processed audio signal and outputting a time-domain representation of the processed audio signal; and
   a mode-dependent sample rate converter receiving said time-domain representation of the processed audio signal and using the resampling factor chosen to match a quotient of a target external sampling frequency and a corresponding internal sampling frequency of the selected mode to output a reconstructed audio signal sampled at the target external sampling frequency, wherein the reconstructed audio signal is output with a block size corresponding to the audio frame rate of the selected mode, wherein the selected mode ensures that an audio frame rate of a received bitstream corresponds to a video frame rate for a video frame format corresponding to the selected mode,
   and further wherein the audio processing system is configured to accept the audio bitstream, wherein the audio bitstream has any one of at least two different pre-defined audio frame rates and the front-end component is operable in the selected mode, and wherein the selected mode is selected in response to a current frame rate of the audio bitstream.

2. The audio processing system of claim 1, wherein the front-end component is operable, for each maximal frame length, at an alternative frame length being a subdivision into equally sized blocks of the maximal frame length, and wherein the plurality of modes is divided into a plurality of subgroups, wherein a first subgroup comprises modes that have audio frame rates that exactly match video frame rates of known coding formats, a second subgroup comprises modes that have audio frame rates higher than that of the first subgroup, and a third subgroup comprises modes that have audio frame rates corresponding to twice the refresh rate in known television formats, and wherein the second mode operates at an external sampling frequency equal to an internal sampling frequency, and further wherein the front-end component comprises a dequantization stage operating in the plurality of modes, each mode having a different audio frame length, and an inverse transform stage synchronized to a mode of the dequantization stage to maintain the selected audio frame length.

3. The audio processing system of claim 1, wherein the plurality of modes comprises at least a first mode having a first range of audio frame rates selected to exactly match video frame rates of known coding formats and a second mode operating at an external sampling frequency, and further wherein resampling factor is a controllable selected value set approximately equal to unity so that each frame of the audio signal contains a number of samples corresponding to the target external sampling frequency.

4. The audio processing system of claim 1, wherein the selected audio frame length is sub-divided into a plurality of shorter subframes to capture audio transients.

5. A method of processing an audio bitstream carrying audio data temporally associated with a stream of video frames, the method comprising:
   receiving, in a front-end component operating in a plurality of modes and configured to receive different audio bitstreams, each segmented into audio frames having different respective frame lengths, and having a variable maximal frame length and having a variable maximal frame length, the front-end component selecting a frame length inversely related to an audio frame rate in a selected mode of a plurality of modes;
   selecting, in the front-end component, a frame length inversely related to an audio frame rate in the selected mode of the plurality of modes, wherein each mode has a different internal sampling frequency, a different audio frame rate, a controllable selected audio frame length different for each mode, and a pre-assigned mode-specific resampling factor within associated with each mode, and wherein the selecting achieves a desired frame-rate adaptability by selecting a greater frame length for a lower audio frame rate, or a lower frame length for a greater audio frame rate;
   processing the audio frames to output a first time-domain representation of an intermediate signal using the selected mode of the plurality of modes;
   receiving, in an analysis filterbank, the time domain representation of the intermediate signal and outputting a second frequency domain representation of the intermediate signal;
   receiving the second frequency domain representation of the intermediate signal and outputting a frequency domain representation of a processed audio signal;
   receiving, in a synthesis filterbank, the frequency domain representation of the processed audio signal and outputting a time-domain representation of the processed audio signal; and
   receiving, in a mode-dependent sample rate converter, the time-domain representation of the processed audio signal and using the resampling factor chosen to match a quotient of a target external sampling frequency and a corresponding internal sampling frequency of the selected mode to output a reconstructed audio signal sampled at the target external sampling frequency, wherein the reconstructed audio signal is output with a block size of different block sizes and corresponding to the audio frame rate of the selected mode, wherein the selected mode ensures that the first audio frame rate corresponds to a video frame rate for a video frame format corresponding to the selected mode, and further wherein the audio bitstream has any one of at least two different predefined audio frame rates and the front-end component is operable in the selected mode, and wherein the selected mode is selected in response to a current frame rate of the audio bitstream.

6. A computer program product comprising a physical, non-transitory computer-readable medium storing instructions for performing the method of claim 5.

7. The method of claim 5, wherein the plurality of modes comprises at least a first mode having a first range of audio frame rates selected to exactly match video frame rates of known coding formats and a second mode operating at an external sampling frequency, and further wherein the resampling factor is a controllable selected value set approximately equal to unity so that each frame of the audio signal contains a number of samples corresponding to the target external sampling frequency.

8. The method of claim 5, wherein the selected audio frame length is sub-divided into a plurality of shorter subframes to capture audio transients.

\* \* \* \* \*